W. GUTHRIE.
MOTOR TRACTOR.
APPLICATION FILED APR. 14, 1919.

1,335,732.

Patented Apr. 6, 1920.
4 SHEETS—SHEET 3.

Witnesses
Geo. Marshall Mackenzie
Mary A. Lindsay

Wm Guthrie INVENTOR
per N. D. Fitzpatrick
ATTORNEY

W. GUTHRIE.
MOTOR TRACTOR.
APPLICATION FILED APR. 14, 1919.

1,335,732.

Patented Apr. 6, 1920.
4 SHEETS—SHEET 4.

Witnesses
Geo. Marshall Mackenzie
Mary A. Lindsay

Wm Guthrie, INVENTOR.
per N. D. Kirkpatrick
ATTORNEY.

UNITED STATES PATENT OFFICE.

WILLIAM GUTHRIE, OF MOTHERWELL, SCOTLAND, ASSIGNOR OF ONE-HALF TO DUNCAN McNAUGHTON WALLACE, OF DENNISTOUN, GLASGOW, SCOTLAND.

MOTOR-TRACTOR.

1,335,732.

Specification of Letters Patent.

Patented Apr. 6, 1920.

Application filed April 14, 1919. Serial No. 289,787.

*To all whom it may concern:*

Be it known that I, WILLIAM GUTHRIE, of Glencroft, Motherwell, Lanarkshire, Scotland, a subject of the King of Great Britain, have invented certain new and useful Improvements in Motor-Tractors, of which the following is a specification.

This invention, which relates to tractors for agricultural and other work, is of the three wheel type and is driven by any suitable form of internal combustion engine or motor.

The tractor has two front driving and steering wheels which pull or draw the tractor and an intermediately disposed rear wheel which pushes the tractor the three wheels being geared together so as to work with combined action, thereby giving the greatest tractive power.

Heretofore with tractors of this type it has been usual to employ some form of balancing or so-called differential gear, owing to the fact that, when turning curves, the outer front wheel describing a curve of longer radius must run at a greater speed than the inner front wheel describing a curve of shorter radius. Such differential gear is objectionable for many reasons and particularly that it involves a divided shaft and one of the objects of the present invention is to dispense with such gear. Another object of the invention is to so dispose the rear wheel relatively to the front wheels and to drive the same that there is no necessity for the employment of differential or other gear for this wheel in order to prevent it locking or skidding when turning at headlands. Another object of the invention is to make a tractor of great tractive power the whole weight of the tractor and the combined effort of the three wheels being utilized to give the maximum drawbar pull when running straight and to provide a machine which is easy to control and can be readily turned at headlands by the co-action of one front wheel and the rear wheel, these wheels describing like arcs.

In the new tractor the three wheels which are preferably of uniform diameter, are geared so as to work in unison and travel at the same linear velocity, when the machine is following a straight course, the two front wheels having driving mechanism so arranged that whichever wheel is the "off" wheel, when the tractor is being turned to the left or right, can work freely.

The steering wheels are driven by means of Hooke's joints, or otherwise, from a cross shaft, inclosed within the front axle, in such manner that they can be continuously driven while being moved angularly for steering purposes, the said cross shaft being driven, in its turn, from a longitudinal shaft universally jointed, and which also constitutes the driving shaft for the rear wheel and is rotatable, by means of driving and reverse gear, from the engine or motor of the tractor; in this way all three wheels can, when following a straight course, be positively driven all together at the same speed, except, when the machine is reversed, when, owing to the fact that the front wheels are "free" wheels, the rear wheel only comes into action.

The front axle to which the steering wheels are jointed in such manner that they can be moved angularly to steer the machine, is capable of swinging, in a vertical plane, about a central pivot, on the frame, so that the steering wheels can automatically cant or adjust themselves to inequalities of ground, such as when one wheel is in a furrow and another wheel on the land.

The machine will, when running a straight course, tend automatically to maintain that course so that it is not then necessary to give special attention to the steering.

On the annexed drawings we have shown, merely by way of illustration or example, one mode of constructing an agricultural tractor in accordance with the invention. Only such parts of the machine are fully shown as are necessary to clearly understand the invention.

On the drawings the same reference letters and numerals, wherever repeated indicate the same parts.

Figure 2:
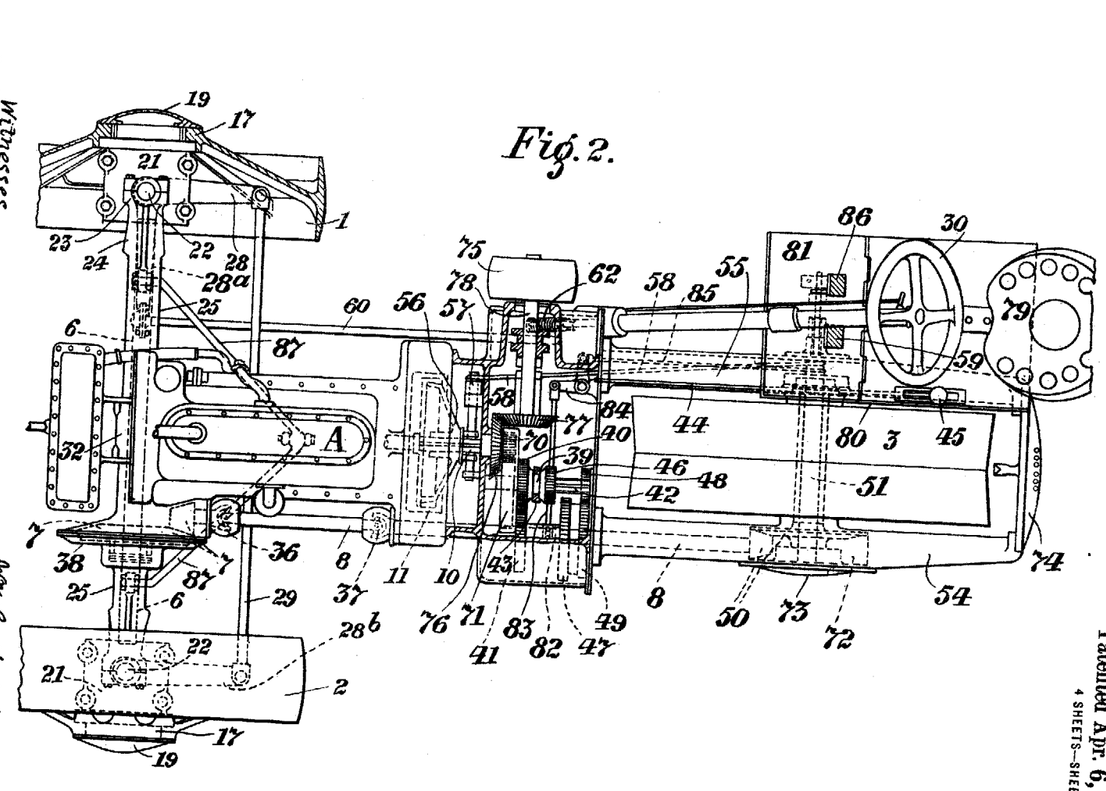
Fig. 2 is a plan view but with one of the front wheels shown in sectional plan. The cover is removed from the gear box in order to show the gear and part of the engine structure is also removed.
Figure 5:
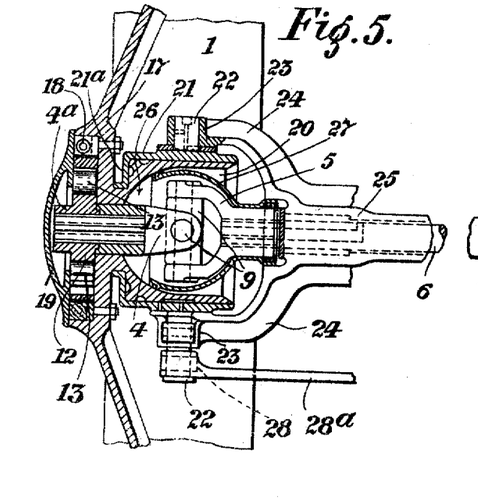
Fig. 5 is a sectional view of the universal joint drive for one of the front wheels.
Figure 6:
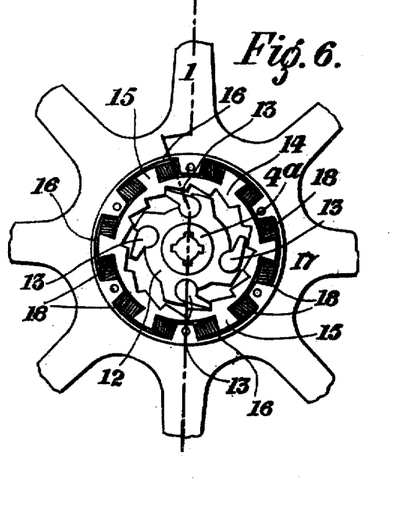
Fig. 6 is a view of the ratchet and pawl driving mechanism of one of the front wheels.

The tractor shown has two front wheels 1, 2, and an intermediately disposed rear wheel 3, the two front wheels being driving and steering wheels while the back wheel is a driving and reversing wheel. The three wheels, which are preferably of the same diameter, as shown, are geared together so as to all travel at the same linear velocity. Each front wheel, as shown at Figs. 5 and 6, is driven by pawl and ratchet gear from a fork 4 universally jointed at 9 to a fork 5 rigidly secured to the end of the cross shaft 6 which latter is driven by means of bevel gear 7 (shown dotted Fig. 2) from a longitudinal shaft 8 which, in its turn, is driven through gearing from the shaft 10 clutched to the fly wheel 11, of the internal combustion motor A. The fork end 4ª has keyed on it a collar 12 which carries a series of pawls 13 capable of engaging, on the free wheel principle, with an internal ratchet ring 14 having, on its exterior, a series of dovetail projections 15. Fitted at each side of the projections and also within arcuate recesses 16 in the wheel hub 17 are pairs of cushioning springs 18. 19 is a removable cover for the pawl and ratchet gear. The wheel hub has a hollow journal 20 which can rotate freely within the bearing 21 which latter has radially projecting pivot pins 22 working within sockets 23 on the forked end 24 of the front axle 25. The journal is spherically hollowed at 26 for the reception of a hollow globular cap 27 which covers the universal joint 9. The bearing 21 which is flanged at 21ª is made in two parts bolted together as shown at Fig. 2. Both front wheels and their gears are similar. The bell crank 28, 28ª, (Fig. 2) is secured to the lower pivot pin 22 of wheel 1 while the arm 28ᵇ is secured to the corresponding pivot pin of the other wheel 2 and the two arms 28, 28ᵇ, are, as usual, connected by a coupling rod 29 while the arm 28ª is operable by a drag link 60, lever 61, worm gear 62 and steering shaft 63 operable by the steering wheel 30 in the usual manner to steer the machine. By moving the link 60 the wheels can be turned angularly, in known manner, in order to steer the tractor and, owing to the universal joint drive 4, 5, 9, this can be done while the wheels are being rotated by the shaft 6. The ratchet and pawl, free wheel drive, permits whichever of the front wheels is the "off" wheel, when the tractor is being turned to right or left, over-running its driving gear the two front wheels consequently, at such times, running at different speeds. When the tractor is being reversed both of the front wheels run free. The pairs of springs 18 give a cushioning action and reduce the uneven or jerky motion due to the action of the universal joint drive when the wheels are being moved angularly to steer the machine.

Figure 1:
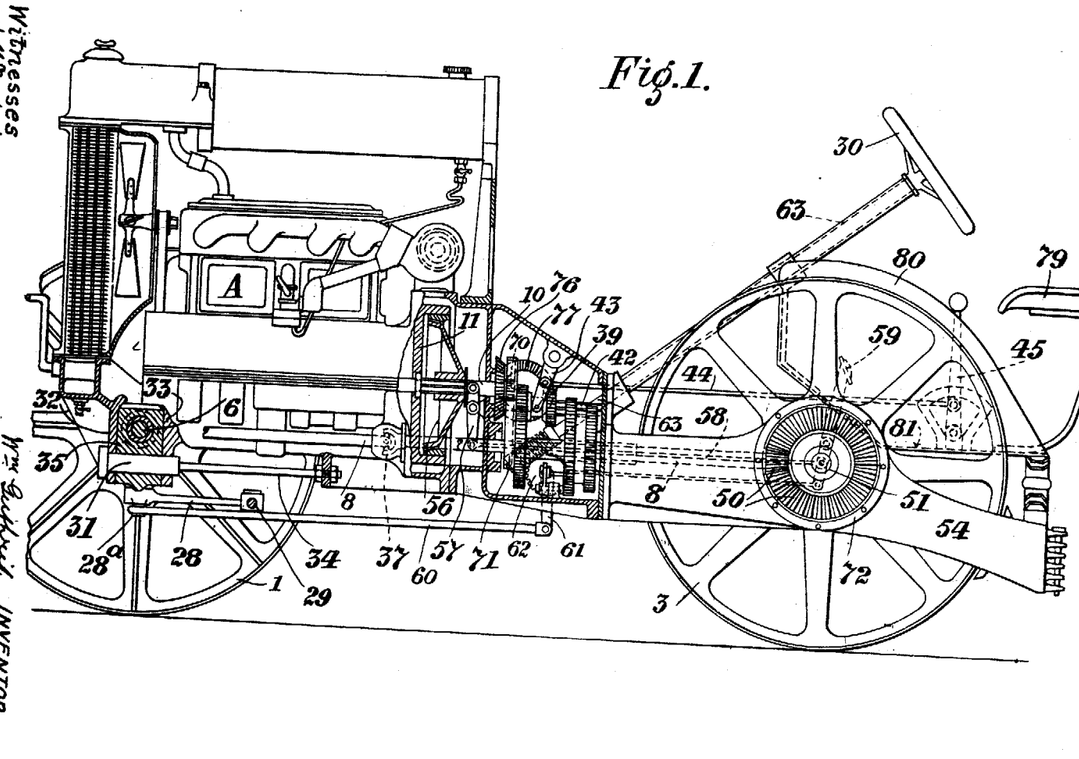
Figure 1 is a side elevation but with parts in section.

The front axle 25 which is hollow and incloses the shaft 6, has a rectangular part 35 at the center (see Fig. 1) through which and the jaws 32, 33, of the frame a strong pivot pin 31 is passed, this pin having an extension rod 34 which is bolted to the underside of the frame. The axle can swing in a vertical plane about the pivot pin 31 and between the jaws 32, 33, in order that the wheels may automatically accommodate themselves to inequalities of the ground, such as when one front wheel is in a furrow and the other on the land.

Owing to the fact that the axle can swing about the pivot pin 31 it is necessary that the shaft 6 should be driven by flexible gear which preferably takes the form of the bevel drive 7 with the bevel pinion driven by the longitudinal shaft 8 which latter is universally jointed at 36, 37. The axle 25 may be made and shaped as at 38 to form a gear box for the bevel drive.

Figures 3, 4:
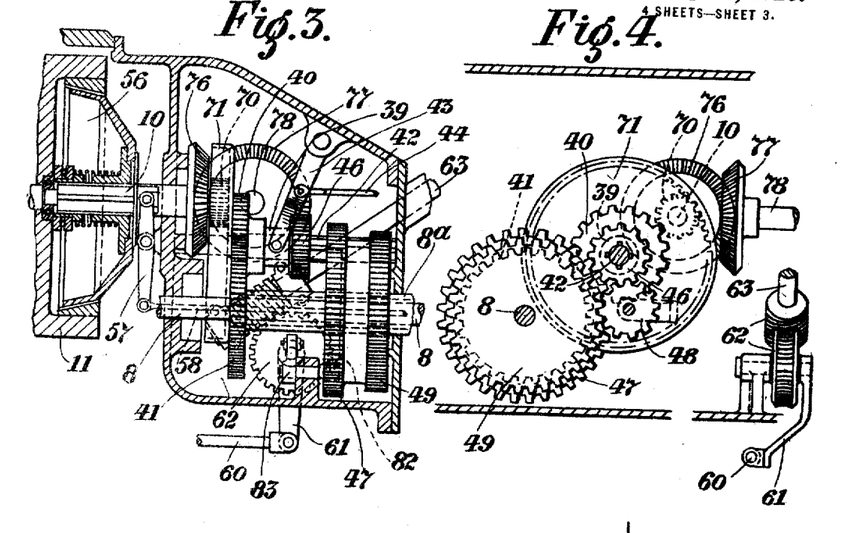
Fig. 3 is an enlarged side view of the driving gear, the gear case with engine fly wheel and driving clutch being in section.
Fig. 4 is a corresponding view of the gear taken at right angles to Fig. 3.

The longitudinal shaft 8 can be driven forward at one or other of two speeds by means of the shifting gear 39 which also effects the reversal. Preferably for agricultural purposes the two speeds are 5 miles and 2½ miles ahead. The gear 39 is slidably carried on a lay shaft 42 and is operable by a forked lever 43, rod 44 and hand lever 45. For the high gear drive (see also Figs. 3 and 4) the wheels 40, 41, are thrown into action; for the low speed drive the wheels 46, 47, are thrown into action and for the reverse the wheels 46, 48 (an idler wheel) and 49 are thrown into action. The shaft 8 drives the back wheel through the bevel gear 50. This back wheel has an axle 51 running, at its ends, in ball bearings in the parts 54, 55, of the machine frame. The shaft 10 is thrown in and out of action by a friction clutch 56 which can be made to engage with the motor fly wheel 11 by the clutch lever 57 operable by the drag link 58 and foot lever 59, and the lay shaft 42 is driven from the shaft 10 by means of the pinion 70 and the internal wheel 71. The wheels 41, 47, 49, are keyed on a sleeve 8ᵃ which is keyed to the shaft 8.

As will be seen, Fig. 2, the back wheel is broader than either of the front wheels and its rim is also hollowed slightly thereby tending to keep the tractor upright when one of the front wheels is in the furrow and the other on the land. For agricultural work the three wheels would have spuds or cleats on their rims.

As will be seen the parts 54, 55, of the frame are made as hollow castings and within the casting 54 the rear end of the shaft 8 is located, the casting being enlarged at 72 to form a gear box for the bevel gear 50. 73 is the cover of the gear box. The cover is removed, Fig. 1.

74 is a bridge piece connecting the two castings 54, 55, and to this bridge piece plows or other implements can be attached.

75 is a belt pulley which can be driven by bevel wheels 76, 77, and shaft 78 from the shaft 10.

79 is the driver's seat. 80 is a guard for the back wheel and which is secured to the platform 81.

82 is the brake acting within the wheel 47 and operable by the gear 83, 84, 85 and foot lever 86.

87 are radius rods.

The internal combustion motor A may be of any suitable design and construction.

Figure 7:
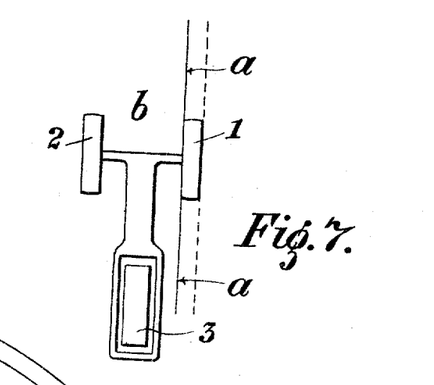
Figs. 7, 8 and 9, are diagrammatic views explanatory of the principle of construction of the tractor.

When the tractor is engaged in plowing and is going ahead in a straight line the three wheels assume the position shown in Fig. 7 and they coöperate together in driving the tractor and drawing the plow, the combined action of the three wheels giving the greatest tractive effort. It will be seen from Fig. 7 that while the right hand wheel 1 may be in the furrow $a$ the left hand wheel 2 and the back wheel are both on the land $b$. Of course, if so desired, it may be arranged that the three wheels shall be on the land the draft connection for the plow being displaced accordingly. Owing to the fact that all the wheels drive together and are made to run at the same peripheral speed it follows, that, if any slipping occurs, all the wheels must slip equally; consequently, there is no possibility of the machine being deflected from its straight course by one of the wheels slipping while the others grip the surface and make a turning effort.

Figure 8:
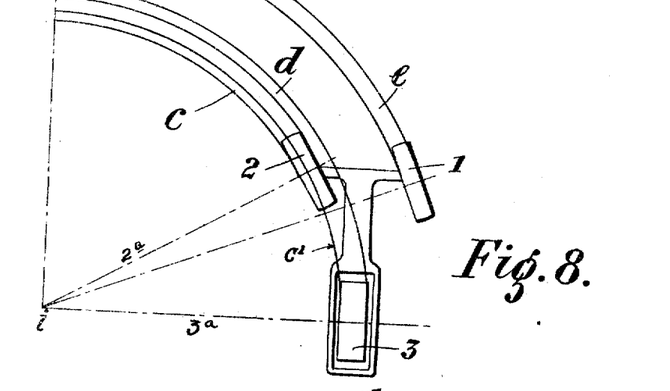

The tractor is constructed so that the track of the inner front wheel, when turning, at headlands, is the same or approximately the same as the track of the rear wheel as shown at Fig. 8 where $c$ is the full width track described by the front wheel 2 and $d$ the full width track described by the back wheel 3. When a curve is being described the inner front wheel and the back wheel rotate at the same speed, being geared together, while the outer or "off" wheel describing the outer and longer track $e$ overruns its ratchet drive.

With agricultural tractors, when turning at headlands, it is desirable to have as small a turning arc as can conveniently be effected. We have found, in practice, in the case of the present tractor with Hooke's joints for the front driving axle that the maximum extent to which it is desirable the front wheels should be turned when steering is through an arc of 120° so that the wheels are, when turned either right or left, not nearer a line coinciding with the axis of the front axle than 30° either way and this angle we use as the factor for determining the position of the back wheel relatively to the front wheels; that is to say, when the inside front wheel 2 (Fig. 8) is turned to an angle of 30° to the front axle then the radius $2^a$ prolonged through the axis of this wheel will cut the point $i$ (the center of the turning arc) and the line $3^a$ constituting a prolongation of the axis of the back wheel should be at (or about) an angle of 30° to the line $2^a$. The lines $2^a$, $3^a$, should be of equal length and constitute radii of the arc $c^1$ which is the path or track described by the actual tread of the wheels 2, 3, when the machine is turning at the headlands. It is desirable to make the wheel base as short as possible and to this end the back wheel may be made broad and with a concave rim and the wheel be so disposed that the arc $c^1$ will fall on the inside edge and not at the center of the back wheel.

If the back wheel were narrow or so disposed that the arc fell at the center of the rim thereof then obviously the equal radii would require to be longer and the track described in turning at the headlands would therefore be somewhat larger.

In the tractor shown the rear wheel 3 is relatively disposed to the front wheels so that, when the machine is turning at the headland, the actual running or pressure line of the back wheel will coincide with the actual running line of that front wheel nearer the center of the curve. As will be seen the back wheel is broad and (as shown at Fig. 2) has a concave rim, while each front wheel has, as usual, a convex rim so that, in turning, to right or left, the pressure on the back wheel is thrown on to that edge thereof which, for the time being, is the inner edge, while the pressure on the front wheel, which for the time being is the inner wheel, is thrown on the crown thereof.

It will be seen, in this tractor, therefore that two of the wheels are positively driven at the same linear velocity on a curve and all the three wheels on the straight.

Figure 9:
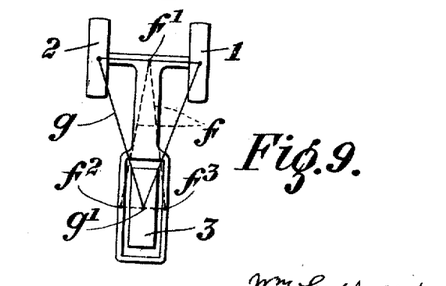

As shown at Fig. 9 the three points of support for the body of the machine are arranged so that, when connected by lines, they form an isosceles triangle $f$ the apex of the triangle being at the pivot $f$ and the ends of the base line at $f^2$, $f^3$, and, contrariwise, the three wheels carrying the machine are disposed so that when connected by lines they form a second isosceles triangle $g$ oppositely disposed to the first one, the base line of the triangle being coincident with the axis of the front axle and the apex of the triangle being at the center $g^1$ of the back wheel.

The body of the machine can move upward and downward turning about the back axle so as to accommodate itself to vertical elevations and depressions in the ground while the front wheels can automatically cant to accommodate themselves to lateral elevations or depressions in the ground.

Although I have shown one mode of constructing the tractor I do not confine myself thereto as it is obvious the various parts may be constructed differently without departing from the underlying principle of the invention.

Having now fully described my invention what I claim and desire to secure by Letters Patent is:—

1. A tractor for agricultural and other work having two front driving and steering wheels, an intermediately disposed wheel in rear of the driving and steering wheels, means for steering the front wheels, means whereby the three wheels are positively driven in conjunction when the tractor is traveling straight forward and only one of the front wheels and the rear wheel when the tractor is turning, and means for operating said last mentioned means.

2. A tractor for agricultural and other work having two front driving and steering wheels, an intermediately disposed wheel in rear of the driving and steering wheels, the three wheels being of the same diameter, means for steering the front wheels, means whereby the three wheels are positively driven in conjunction when the tractor is traveling straight forward and only one of the front wheels and the rear wheel when the tractor is turning, the other front wheel running free, and means for operating said last mentioned means.

3. A tractor for agricultural and other work having two front driving and steering wheels, an intermediately disposed wheel in rear of the driving and steering wheels, the three wheels being of the same diameter but the rear wheel being concaved on its rim and made broad so that, when the tractor is turning, the pressure is thrown on one or other edge of said rim, means for steering the front wheels, means whereby the three wheels can be driven in conjunction and means for operating said last mentioned means.

4. A tractor for agricultural and other work having two front driving and steering wheels, an intermediately disposed wheel in rear of the driving and steering wheels, means whereby the front wheels can automatically adapt themselves to inequalities in the ground without canting the body of the tractor, means for steering the front wheels, means whereby the three wheels are driven positively in conjunction when the tractor is traveling straight forward and only one of the front wheels and the rear wheel when the tractor is turning, and means for operating said last mentioned means.

5. A tractor for agricultural and other work having two front driving and steering wheels, an intermediately disposed wheel in rear of the driving and steering wheels, means whereby the front wheels can automatically adapt themselves to inequalities in the ground without canting the body of the machine which can remain upright on the rear wheel which is broadened for the purpose, means for steering the front wheels, means whereby the three wheels are positively driven in conjuction when the tractor is traveling straight forward and only one of the front wheels and the rear wheel when the tractor is turning, and means for operating said last mentioned means.

6. A tractor for agricultural and other work having two front driving and steering wheels, an intermediately disposed wheel in rear of the driving and steering wheels, means for driving the three wheels without employing differential mechanism and means whereby the front wheels, while being driven, can also be moved angularly for steering purposes, the said driving means acting to positively drive all three wheels in conjunction when the machine is going straight forward and only one of the front wheels and the rear wheel in conjunction when the tractor is being steered around curves.

7. A tractor for agricultural and other work having two front wheels and an intermediately disposed back wheel, means for positively driving the wheels in conjunction and at the same speed when the tractor is going forward said means positively driving the back wheel and that front wheel which is for the time being the inner wheel in conjunction and at the same speed when the tractor is turning.

8. A tractor for agricultural and other work having two front driving and steering wheels, means for driving said wheels only in a forward direction, an intermediately disposed wheel in rear of the driving and steering wheels, means for driving said intermediate wheel in either a forward or backward direction, and means whereby the front wheels, while being driven, can also be moved angularly for steering purposes.

9. A tractor for agricultural and other work having two front driving and steering wheels, means for driving said wheels only in a forward direction, an intermediately disposed wheel in rear of the driving and steering wheels, means for driving said intermediate wheel forward or backward, means for driving the three wheels in conjunction when going forward and only one front wheel and the back wheel when the machine is turning curves, and means whereby the front wheels, while being driven, can also be moved angularly for steering purposes.

10. A tractor for agricultural and other work having two front combined driving and steering wheels, means whereby these wheels can over-run their driving gear, an intermediately disposed driving and reversing wheel in rear of the driving and steering wheels, means for driving the three wheels, and means whereby the front wheels, while being driven, can also be moved angularly for steering purposes.

11. A tractor for agricultural and other work having two front driving and steering wheels, an intermediately disposed wheel in rear of the driving and steering wheels, non-differential mechanism whereby the inner front wheel, when the tractor is making a curved course, runs at the same speed as the rear wheel and the outer front wheel can run at a greater speed, means for positively driving the three wheels in conjunction when the machine is going forward, a frame carried by the three wheels, and a motor for driving the wheels on the frame.

12. A tractor for agricultural and other work having two front driving and steering wheels, an intermediately disposed wheel in rear of the driving and steering wheels, means for positively driving the three wheels in conjunction, when the tractor is traveling straight forward and one of the front wheels and the rear wheel when the tractor is turning, a frame carried by the three wheels, an axle for the front wheels, an axle for the rear wheel, the frame being pivotally supported at the center of the axle of the front wheels and being carried on the ends of the axle of the rear wheel.

13. A tractor for agricultural and other work having two front driving and steering wheels, an intermediately disposed wheel in rear of the driving and steering wheels, means for steering the front wheels, means whereby the three wheels can be driven forward in conjunction at two different speeds and means whereby the tractor can be reversed by the rear wheel alone at a single speed.

14. A tractor for agricultural and other work having two front wheels, a single shaft for driving both the wheels, jointing means between said shaft and the wheels permitting angular movement of the latter while being driven, means whereby either of said wheels can run freely on the shaft, means for moving said wheels angularly to the shaft, a wheel in rear of the front wheels, a second shaft for driving said rear wheel and also the shaft of the front wheels simultaneously and means for driving said second shaft.

15. A tractor for agricultural and other work having two front wheels, a shaft for positively driving the wheels at the same speed, jointing means between said shaft and the wheels permitting angular movement of the latter while being driven, a hollow axle for the front wheels and within which said shaft is disposed, means whereby the axle can swing in a vertical plane while the shaft therein is being driven, means whereby either of said front wheels can run freely on the shaft, means for moving said wheels angularly to the shaft while the shaft therein is being driven, a wheel in rear of the front wheels, a second shaft for driving said rear wheel and also the shaft of the front wheels simultaneously and at the same speed said second shaft being universally jointed and means for driving said second shaft.

16. A tractor for agricultural and other work having a frame carried by two front driving and steering wheels and by an intermediately disposed wheel in rear of the driving and steering wheels, a shaft for positively driving the front wheels at the same speed, jointing means between said shaft and the front wheels permitting angular movement of the latter while being driven, a hollow axle for the front wheels and within which said shaft is disposed, means whereby the axle can swing in a vertical plane on the frame while the shaft therein is being driven, means whereby either of said front wheels can run freely on the shaft, means for moving said wheels angularly to the shaft, a wheel in rear of the front wheels, a second jointed shaft for driving said rear wheel, and also the shaft of the front wheels simultaneously and at the same speed said second shaft being universally jointed and means for driving said second shaft.

17. A tractor for agricultural and other work having a frame supported at the front by two driving wheels and at the back by a rear driving wheel, means for driving the three wheels in conjunction and at the same speed when the tractor is traveling straight forward, free wheel means permitting the front wheels to also run at different speeds when the tractor is turning and means whereby the rear wheel alone is driven when the tractor is reversed.

18. A tractor for agricultural and other work having a frame supported at the front by two driving wheels and at the back by a rear driving wheel, means for driving the three wheels simultaneously and at the same speed, means whereby the front wheels can be moved to steer the tractor while they are being driven, free wheel means permitting the front wheels to also run at different speeds when the tractor is being turned to left or right and means whereby the rear wheel alone is reversed.

19. A tractor for agricultural and other work having a frame supported at the front by two driving and steering wheels and at the back by a rear driving wheel, means for driving the three wheels simultaneously and at the same speed, free wheel driving gear permitting the front wheels to also run at different speeds, means for operating the front wheels to steer the same and means whereby the rear wheel alone is reversed.

20. A tractor for agricultural and other work having a frame pivotally supported at the front by two driving wheels and non-pivotally supported at the back by a rear driving wheel, means for driving the three wheels simultaneously and at the same speed, free wheel driving means permitting the front wheels to also run at different speeds and means whereby the rear wheel alone is reversed.

21. A tractor for agricultural and other work having a frame supported at the front by two driving wheels and at the back by a rear driving wheel, means for driving the three wheels simultaneously in combination and at the same linear velocity and in the same direction and means whereby, to reverse the tractor, only the rear wheel is driven.

22. A tractor for agricultural and other work having a frame supported at the front by two driving wheels pivotally jointed to an axle pivoted at the front of the frame, and at the back by a rear driving wheel, means for driving the three wheels together simultaneously and at the same linear velocity and means whereby when the machine is turning at headlands one of the front wheels and the back wheel only is positively driven in conjunction the wheels traveling in the same track.

23. A tractor for agricultural and other work having a frame supported at the front by two driving wheels pivotally jointed to an axle pivoted at the front of the frame, and at the back by a rear driving wheel, means for driving the three wheels together simultaneously and at the same peripheral speed, means whereby one of the front wheels and the back wheel can run at the same speed while the other front wheel can run free.

24. A tractor for agricultural and other work having a frame supported at the front by two driving wheels, and at the back by a rear driving wheel, a free wheel drive for each front wheel, means for driving the rear wheel in conjunction with the front wheels when the machine is going forward, and means whereby the rear wheel alone is reversed.

25. A tractor for agricultural and other work having a frame supported at the front by two driving wheels, and at the back by a rear driving wheel, a ratchet and pawl drive for each front wheel, a gear drive for the rear wheel, means for driving the three wheels simultaneously and at the same linear velocity in a forward direction and means whereby the rear wheel alone is reversed.

26. A tractor for agricultural and other work having a frame supported at the front by two driving wheels, and at the back by a rear driving wheel, a spring cushioned ratchet and pawl drive for each front wheel, a gear drive for the rear wheel, means for driving the three wheels simultaneously and at the same speed in a forward direction and means whereby the rear wheel alone is reversed.

27. A tractor for agricultural and other work having a rear wheel, two front wheels, means for driving the wheels in conjunction and at the same speed when the machine is going forward, means whereby one of the front wheels can over-run its driving gear when the machine is turning, and means for steering the front wheels.

28. A tractor for agricultural and other work having a rear wheel, two front wheels one at either side of and in advance of the rear wheel, said rear wheel describing a path midway between the front wheels when the machine is going straight forward and following in the same track as the inner front wheel when the machine is turning at headlands, means for driving the wheels in conjunction and at the same linear velocity when the machine is going forward, means whereby one of the front wheels can over-run its driving gear when the machine is turning, and means for steering the front wheels.

29. A tractor for agricultural and other work having a rear wheel, two front wheels one at either side of and in advance of the rear wheel said rear wheel describing the same track as the inner front wheel when the machine is turning at headlands, means for driving the wheels in conjunction and at the same linear velocity, means for reversing the rear wheel only, and means for steering the front wheels.

30. A tractor for agricultural and other work having a rear wheel, two front wheels disposed one at either side of and in advance of the rear wheel, the three wheels being of uniform diameter, means for positively driving the wheels in conjunction and at the same linear velocity when the machine is going forward and only one of the front wheels and the rear wheel when turning curves, and means causing the inner front wheel and the rear wheel to follow the same track when turning at headlands and means for steering the front wheels.

31. A tractor for agricultural and other work having three wheels, a back wheel and two front wheels, means for positively driving all the three wheels in conjunction and at the same linear velocity when going forward, means whereby the back wheel and one of the front wheels are positively driven at the same linear velocity when turning curves and means whereby only one wheel is driven when reversing.

32. A tractor for agricultural and other work having a back wheel and two front wheels, means for positively driving all the three wheels in conjunction and at the same linear velocity when going forward, and means whereby the back wheel and one of the front wheels are positively driven at the same linear velocity when turning curves.

33. A tractor for agricultural and other work having a back wheel and two front wheels, means for positively driving all the three wheels in conjunction and at the same linear velocity when going forward, means whereby the back wheel and one of the front wheels are positively driven together and at the same linear velocity when turning curves the other front wheel running free, and means whereby only one wheel is driven when reversing.

34. A tractor for agricultural and other work having a back wheel and two front wheels, means for positively driving all the three wheels in conjunction and at the same linear velocity when going forward, means whereby the back wheel and one of the front wheels are positively driven at the same linear velocity when turning curves and both wheels follow the same track, and means whereby only one wheel is driven when reversing.

35. A tractor for agricultural and other work having a back wheel and two front wheels, means for positively driving all the wheels in conjunction and at the same three wheels in conjunction and at the same linear velocity when going forward, means whereby the back wheel and one of the front wheels are positively driven when turning curves, and means whereby only the back wheel is driven when reversing.

36. A tractor for agricultural and other work having a back wheel and two front wheels, means for positively driving all the three wheels in conjunction and at the same linear velocity when going forward and for driving the back wheel and one of the front wheels only in conjunction when turning curves, and means whereby only the back wheel is driven when reversing.

In testimony whereof I affix my signature in presence of two witnesses.

WM. GUTHRIE.

Witnesses:
 MARY GREEN,
 CATHIE LAURIE.